US006287681B1

(12) United States Patent
Mehta et al.

(10) Patent No.: US 6,287,681 B1
(45) Date of Patent: Sep. 11, 2001

(54) PREPARATION OF WEAR-RESISTANT LAMINATES USING MINERAL PIGMENT COMPOSITES

(75) Inventors: Mahendra Mehta, Pittsfield, MA (US); Amitabh Das, Pickerington; John Rourke, Chillicothe, both of OH (US)

(73) Assignee: The Mead Corporation, Dayton, OH (US)

(*) Notice: Subject to any disclaimer, the term of this patent is extended or adjusted under 35 U.S.C. 154(b) by 0 days.

(21) Appl. No.: 09/357,473

(22) Filed: Jul. 20, 1999

(51) Int. Cl.[7] .......... B32B 5/16

(52) U.S. Cl. .......... 428/323; 428/330; 428/331; 428/402; 428/403; 428/404; 428/407; 442/294; 442/417

(58) Field of Search .......... 442/294, 417, 442/323, 330, 331; 428/402, 403, 407

(56) References Cited

U.S. PATENT DOCUMENTS

| | | | | |
|---|---|---|---|---|
| 3,786,041 | | 1/1974 | Talsma . | |
| 3,968,291 | | 7/1976 | Chevallier . | |
| 4,076,666 | | 2/1978 | Power et al. . | |
| 4,263,081 | | 4/1981 | Scher et al. . | |
| 4,284,453 | | 8/1981 | Endrizzi . | |
| 4,322,468 | | 3/1982 | Raghava . | |
| 4,371,579 | * | 2/1983 | McCaskey et al. | 428/204 |
| 4,376,812 | | 3/1983 | West . | |
| 4,400,423 | | 8/1983 | Scher et al. . | |
| 4,430,375 | | 2/1984 | Scher et al. . | |
| 4,450,194 | | 5/1984 | Kauffman et al. . | |
| 4,530,856 | | 7/1985 | Kauffman et al. . | |
| 4,547,245 | | 10/1985 | Colyer . | |
| 4,567,087 | | 1/1986 | O'Dell et al. . | |
| 4,741,946 | | 5/1988 | Ungar et al. . | |
| 4,869,957 | | 9/1989 | Vankerckhoven et al. . | |
| 4,880,689 | | 11/1989 | Park et al. . | |
| 4,950,500 | | 8/1990 | Kauffman et al. . | |
| 4,971,855 | | 11/1990 | Lex et al. . | |
| 5,230,945 | | 7/1993 | Dees, Jr. et al. . | |
| 5,252,378 | * | 10/1993 | Mehta et al. | 428/195 |
| 5,268,204 | | 12/1993 | Hill et al. . | |
| 5,288,540 | | 2/1994 | Albrinck et al. . | |
| 5,344,704 | | 9/1994 | O'Dell et al. . | |
| 5,350,624 | | 9/1994 | Georger et al. . | |
| 5,362,557 | | 11/1994 | Albrinck et al. . | |
| 5,433,824 | | 7/1995 | Richardson . | |
| 5,478,640 | | 12/1995 | Berbner et al. . | |
| 5,545,476 | | 8/1996 | O'Dell et al. . | |
| 5,558,906 | | 9/1996 | Albrinck et al. . | |
| 5,728,797 | | 3/1998 | O'Dell et al. . | |
| 5,807,608 | | 9/1998 | O'Dell et al. . | |
| 5,820,937 | | 10/1998 | Hill et al. | 427/420 |
| 5,962,134 | | 10/1999 | Shah et al. | 428/407 |

FOREIGN PATENT DOCUMENTS

| | | |
|---|---|---|
| 0472036 A1 | 8/1991 | (EP) . |
| 0 590 693 | 4/1994 | (EP) . |
| 1591954 | 12/1977 | (GB) . |
| WO 97/26410 | 7/1997 | (WO) . |

OTHER PUBLICATIONS

International Search Report mailed Nov. 3, 2000, regarding corresponding International Application PCT/US00/19635.

* cited by examiner

*Primary Examiner*—Terrel Morris
*Assistant Examiner*—Ula C. Ruddock
(74) *Attorney, Agent, or Firm*—Thompson Hine LLP

(57) ABSTRACT

Wear resistant overlays for use in decorative laminates and laminates prepared therefrom comprising a web of cellulosic fibers having deposited on the surface thereof a layer of mineral pigment composite particles wherein said composite particles comprise mineral pigment particles embedded in a cured carrier material are disclosed. A process for forming an abrasion resistant overlay sheet which comprises forming a web of cellulosic fibers on a papermaking machine and applying a slurry including mineral pigment composite particles to the upper surface of the web on the papermaking machine wherein said mineral pigment composite particles comprise mineral pigment particles embedded in a cured carrier material is also disclosed.

18 Claims, No Drawings

PREPARATION OF WEAR-RESISTANT LAMINATES USING MINERAL PIGMENT COMPOSITES

BACKGROUND OF THE INVENTION

The present invention relates to a wear resistant overlay for use in a decorative laminate and flooring and to laminates and flooring prepared therefrom. Decorative laminates have been conventionally made by stacking a plurality of layers of paper impregnated with synthetic thermosetting resins. Normally, the assembly consists of a plurality (for example, three to eight) core sheets made from phenolic resin impregnated Kraft paper, above which lies a decor sheet, usually a print or solid color, impregnated with melamine resin. An overlay sheet is often provided on top of the decor sheet which, in the laminate, is made to be as transparent as possible and which provides protection for the decor sheet.

The overlay sheet can be formed in a number of different ways. In one, the overlay is a sheet of cellulose fibers having a very low basis weight which carries therein and thereon abrasion resistant particles. Conventionally, the cellulose fibers are deposited on the papermachine wire from a first headbox and overcoated with a slurry of mineral particles which are deposited from a secondary headbox. The slurry of mineral particles cascades over and through the cellulose fibers and causes many of the mineral particles to become embedded in the overlay where they are not as effective in preventing abrasion. Also much of the mineral particles is washed to the floor of the papermachine. Thus, the conventional practice of depositing mineral particles from a secondary headbox is terribly inefficient in terms of the usage of the mineral particles.

One method for more efficiently depositing the mineral particles involves use of a slot orifice coater such as a curtain coater instead of a secondary headbox as described in U.S. Pat. No. 5,820,937.

SUMMARY OF THE INVENTION

In accordance with the present invention, abrasion resistant mineral pigment particles are incorporated into a suitable carrier material to produce mineral pigment composites. These composites can be coated on the overlay from a secondary headbox or any other coating device. Because the mineral pigment particles are embedded in a carrier material as part of a larger mineral pigment composite particle, the particles tend to be retained at the surface of the overlay where they are more effective in preventing abrasion. Additionally, the carrier material encompassing the mineral particles functions as a protective barrier between the abrasive mineral particles and scratch sensitive surfaces, such as highly polished caul plates. Such overlays can be used for manufacture of decorative laminates, furniture components, flooring laminates and other surfaces where wear protection is needed.

DETAILED DESCRIPTION

Except for the transparent protective layer overlaying the decor sheet, the laminate of the present invention is suitably made according to standard practice and suitably has a conventional construction, e.g., it can comprise 2 to 8 core sheets formed of phenolic impregnated Kraft paper with a melamine resin impregnated decor sheet thereover, plus the protective layer of the present invention over the decor layer pressed by a mirror plate to a high gloss finish. The final laminate is made in the typical way such as by stacking the core layers on a suitable press or pressing plate die with the protective layer-coated decor sheet thereover, and subjecting the assembly to sufficient heat and pressure between the bottom pressing plate die and the highly polished upper pressing plate die for a time sufficient to produce the desired decorative laminate. The conditions of pressing for both high pressure laminate and low-pressure laminate are standard and well known.

One of the key features of the present invention is the utilization of a suitable carrier material into which the mineral particles can be dispersed to form a composite capable of being cured, solidified or otherwise hardened and individuated into discrete composite particles containing abrasion resistant particles. The abrasion resistant mineral pigment particles are dispersed or otherwise introduced into a molten, uncrosslinked, uncured or dissolved form of a suitable carrier material to produce a mineral pigment composite slurry. The mineral pigment composite slurry is solidified, cured or otherwise hardened and processed to produce mineral pigment composite particles at a desired particle size. Each mineral pigment composite particle preferably contains one or more abrasion resistant particles encased in a cured carrier material. The term "cured" as used herein is not limited to materials which are cross-linked, but is open to materials which set, harden or solidify by any known means such as polymerization, removal of solvent, freezing, chemical reaction, etc.

The mineral pigment composite particles are coated on the overlay from a secondary headbox or any other coating device. Although the composite particles are typically applied to the sheet in place of the regular abrasion resistant particles, in some applications it may be advantageous to use both types of particles. If both the abrasion resistant particles and the mineral pigment composite particles are used they can either be admixed and applied as a single coating or applied separately from two different units. When used in combination with the regular abrasion resistant particles, the mineral pigment composites function as spacers and separators which prevent the abrasive grit particles from coming into contact with and damaging the caul plates during the lamination process.

The mineral pigment composite particles are larger than the abrasion resistant particles alone and, therefore, are less likely to be carried through the web with the white water being drained from the web. The carrier material surrounding the abrasion resistant particles also improves the retention of the particles on the sheet by acting as a coupling agent to improve adhesion between the composite particles and the laminating resin. In a preferred embodiment of the invention, the mineral pigment composites are extruded in the form of filaments. The filamentous form of the composite particle further enhances particle retention by spanning pores in the paper structure and increasing the degree of intermeshing with the mat of cellulosic fibers. Whereas conventional grit tends to become embedded in the sheet to different degrees or falls through the sheet with the white water, the mineral pigment composites of the present invention remain essentially on the surface of the sheet where they are most needed for abrasion resistance. Furthermore, the larger composite particles are easier to process during the coating operation. Since the particles remain on the surface of the sheet and are easier to process, less grit can be used and yet still provide acceptable levels of abrasion resistance.

The carrier material also functions as a protective barrier between the abrasive mineral particles embedded in the composite and scratch sensitive surfaces, such as caul plates. Abrasive mineral particles added to wear resistant sheets to impart wear resistance to the laminates produced therefrom can cause excessive incidental wear to various components on the paper machine and auxiliary finishing and handling equipment. The highly polished caul plates used during the high pressure laminating process are particularly susceptible to incurring damage as a result of coming in contact with the sharp exposed edges of the mineral pigments. In accordance with the present invention, the abrasive mineral pigments are embedded in a curable carrier material to form mineral pigment composites. The cured carrier material protects scratch sensitive components by covering and rounding off the sharp edged surface features of the abrasive mineral pigments. Therefore, overall production costs are reduced because repair and replacement costs for the paper machine, secondary equipment and caul plates are minimized.

In a preferred embodiment of the invention, the carrier material is a thermoset resin which, in its pre-cured state, has the same or substantially the same index of refraction as the laminating resin used in the laminating process after the latter has become thermoset during the laminating procedure. The thermoset resin, having abrasion resistant mineral particles dispersed therein, is pre-cured to produce a mineral pigment composite. In this particular embodiment, the pre-cured mineral pigment composite is ground thereby producing a plurality of reduced particle size mineral composite particles. The mineral pigment composite particles are ground to an average particle size of between about 1 to 400$\mu$, and preferably from about 20 to 200$\mu$. What is meant by the term "pre-cured" is that the cure or set of the resin particles has been advanced either to the maximum degree possible or at least to a stage of cure where the melt viscosity of the pre-cured resin particles is sufficiently high to prevent these particles from dissolving in the liquid laminating resin and/or melting and flowing under usual laminating conditions and thus undesirably saturating into the underlying paper, e.g. the decor paper, during pressing/laminating to form the laminate. In the resultant laminate, the pre-cured resin particles are normally cured to a greater degree than the laminating resin, the latter forming a matrix for the former.

As indicated above, the typical laminating resin normally used to saturate/impregnate the decor and overlay sheets in the conventional high pressure laminating process to produce high pressure decorative laminates meeting NEMA standards is melamine resin, and consequently melamine resin is the preferred laminating resin for use in the upper layer or layers of the present invention. Consequently, the preferred thermoset resin carrier material is also melamine resin. However, other resin systems are possible, e.g. polyesters, urea-formaldehyde, dicyandiamide-formaldehyde, epoxy, polyurethane, curable acrylics and mixtures thereof. The thermoset resin carrier material can thus be selected from the group consisting of melamine, polyester, epoxy and curable acrylic, etc. or mixtures thereof.

In another embodiment of the present invention, abrasion resistant particles are dispersed in a molten, uncrosslinked or dissolved form of a suitable carrier material. The mineral pigment slurry is pumped into a pressurized manifold and extruded through a plurality of orifices to form grit laden filaments which are drawn down to a thin diameter. The composite filaments are cured and then reduced to the desired size, typically from about 0.5 to 10 mm and preferably from about 1 to 4 mm in length with diameters ranging from about 10 to 100 microns and preferably 30 to 70 microns. Mineral pigment composites in filamentous form are advantageous in that the shape of the composite improves retention of the grit on the surface of the sheet. The filamentous shape is less likely to be drained through the web with the white water and tends to become intertwined with the fibers forming the web.

Carrier materials suitable for producing filamentous mineral pigment composites in accordance with the present invention include inorganic materials such as, for example, molten glass, molten quartz and soluble silicates, as well as organic materials such as, for example, nylon, polyurea, polyurethane, polyacrylates, polyvinyl alcohol, melamine resins, etc. or mixtures thereof. Selection of an appropriate carrier material depends on a number of factors including curing mechanism, compatibility with the laminating resin and index of refraction. Preferably the carrier material should improve adhesion and transparentization of the mineral pigments within the laminate.

In accordance with the present invention, a uniform layer of mineral pigment composite particles or mineral pigment laden filaments are applied to the surface of a fibrous cellulosic overlay sheet from a composite-containing slurry using a secondary headbox or any other coating device. The mineral pigment composite particles of the invention can be applied to the sheet by any process used for applying normal grit. A preferred device for depositing the mineral pigment composite particles is either a secondary headbox or a slot orifice coating head applicator. The term "slot orifice coater" as used herein is used in the same manner it is used in the art, namely, to designate a coater having a central cavity which opens on and feeds a slot through which the coating is forced under pressure. Examples of slot orifice coaters useful in the present invention include curtain coaters in which the overlay is coated as it passes through a falling curtain of the coating composition and coaters in which the overlay is coated as it contacts a bead of the coating composition as it is extruded from a slot orifice. The latter type coaters can be oriented to coat the substrate as it passes directly above the coater, directly below the coater or to the side of the coater. The slot width of the slot orifice coaters used in the process typically range from 0.4 to 0.8 mm. The gap height (i.e., the distance between the edge of the slot orifice and the substrate surface) is about 0.5 to 1.55 mm when coating form a bead and about 2.5 to 25 mm when coating form a curtain. The coating head pressure is about 5 to 25 psi when coating form a bead and about 5 to 150 psi when coating from a curtain. A slot orifice coater useful in the present invention is sold by Liberty Tool Corp. under the tradename Technikote. Other manufacturers also make slot orifice coaters useful herein. The sheet may be a decor sheet or an overlay sheet.

An aqueous slurry of mineral pigment composite particles from a supply tank is transferred through a coating supply line to a positive displacement pump which pumps a predetermined amount of the slurry to the slot orifice coating head. An agitating means such as a static mixer may be positioned between the pump and the slot orifice coating head to prevent the composite particles from settling out of the slurry. The composite-containing slurry is then applied to the raw fibrous cellulosic web using the slot orifice coater which distributes the composite-containing slurry evenly across the surface of the web. Preferably the slot orifice coater is a curtain coater. The coated web is then dried by any conventional means to provide a fibrous cellulosic sheet such as a decor sheet or overlay sheet having a layer of abrasion-resistant mineral pigment composites on the surface of the sheet.

The slot orifice coating head applicator enables the delivery of a predetermined amount of the slurry mixture to be applied in an evenly distributed manner to the surface of the overlay sheet at a coat weight of about 2 to 40 pounds per 3000 square feet (dry basis). The use of the slot orifice coating head applicator not only increases the efficiency of the operation by evenly distributing the grit slurry mixture across the decor sheet but it reduces the cost of the process significantly by reducing waste while still achieving required or desirable product standards.

The use of the slot orifice coating head applicator also enables the introduction of other materials and additives which are typically employed in such overlays to be incorporated directly into the mineral pigment composite slurry. For example, the incorporation of melamine resin in the mixture is possible and would allow the application of both resin and composite particles to the fibrous cellulosic sheet in a single step. The line speeds which can be used will vary with the nature of the coating composition and the specific type of slot orifice coater used. Line speeds of about 1 to 100 fpm can be used when the coating is applied from a bead whereas line speeds of about 500 to 4000 fpm can be used when the coating is applied from a curtain.

The slot orifice coater can be used to apply slurries containing about 5% to 95% and, more particularly, about 10% to 80% solids. By comparison, a secondary headbox is generally not useful in applying slurries containing more than about 0.5 to 5% and more particularly about 1% or 2% solids. As a result of the higher slurry concentrations that can be applied in the with a slot orifice coater, higher line speeds and/or lower coating flow rates can be used than are feasible with application of the slurry from a secondary headbox. In particular, using the headbox, it is not unusual when coating a web 10 feet wide to apply the coating at a flow rate of 500–1000 gallons per minute. At these rates, water from the coating slurry cascades through the sheet and carries significant quantities of unretained grit with it. With the slot orifice coaters, on the other hand, flow rates on the order of 5 to 10 gallons per minute are commonly used when coating a web 10 feet wide from a bead and 5 to 50 gallons per minute when coating from a curtain and the quantities of water and unretained grit are substantially less. Regardless of the application process, improvements in grit retention can be obtained by using mineral pigment composite particles, and in particular, filamentous composites, in accordance with the present invention.

The mineral pigment or grit employed in the present invention can be a mineral particle such as silica, alumina, alundun, corundum, emery, spinel, as well as other materials such as tungsten carbide, zirconium boride, titanium nitride, tantalum carbide, beryllium carbide, silicon carbide, aluminum boride, boron carbide, diamond dust, and mixtures thereof. The mineral pigments should preferably have a hardness of at least 7 on the Moh scale. The suitability of the particular grit will depend on several factors such as availability, cost, particle size distribution and even the color of the particles. Considering cost availability, hardness, particle size availability and lack of color, aluminum oxide is the preferred grit for most applications. End use performance dictates the basis weight, ash loading, size and type of grit particles. The grit typically has an average particle size of about 10 to 100 microns preferably 30 to 70 microns and a particle size distribution of about 1 to 150 microns. The grit particles are smaller than the mineral pigment composites. The average mineral pigment composites are typically about 1.5 to 4 times the size of the grit particles.

The mineral pigment composite slurry employed in the present invention typically includes a binder material. The binder material may be any of the commonly used binders such as melamine resins, polyvinyl alcohol, acrylic latex, starch, casein, styrene-butadiene latex, carboxymethyl cellulose (CMC), microcrystalline cellulose, sodium alginate, etc., or mixtures thereof which are used in coating compositions where the coating material is to be bonded to a substrate such as a decor sheet or overlay sheet. Melamine resins such as melamine-formaldehyde are advantageously used as the binder material in the present invention since the melamine-formaldehyde resin is also commonly used to saturate the decor sheet. The binder is usually employed in an amount of about 1 to 10% by weight of coating solids. When coating from a head box no binder is usually used.

Preferably the slurry has a viscosity of about 50 to 150 cps when coating from a bead and about 50 to 500 cps when coating from a curtain. For curtain coating, the slurry preferably includes a small amount of a surfactant (0.05 to 0.5%).

The overlay sheet is formed from fibers conventionally used for such purpose and, preferably, is a bleached kraft pulp. The pulp may consist of hardwoods or softwoods or a mixture of hardwoods and softwoods which is normally preferred. Higher alpha cellulose such as cotton may be added to enhance certain characteristics such as postformability. The basis weight of the uncoated overlay sheet may range from about 10 to 40 pounds per 3000 square feet, and preferably about 15 to 40 pounds per 3000 square feet.

Abrasion values of 500–15,000 Taber cycles can be achieved by selecting the mineral pigment composite and the base stock and adjusting basis weight, ash content, size of mineral pigment composite and size of aluminum oxide filler coating conditions within the aforesaid parameters.

The invention will be illustrated in more detail by the following non-limiting example.

Example $Al_2O_3$ powder of particle size less than $20\mu$ is mixed with melamine saturating resin at a 50:50 ratio by weight. The mineral pigment composite is cured to a polymer by adding an appropriate catalyst and heat. Then the cured mineral pigment composite is ground to an average particle size of about $100\mu$. Each composite particle contains many smaller mineral pigment particles.

An abrasive overlay is made by adding 10% based on fibers of the mineral pigment composite particles during the papermaking process. The composite particles can be added as the primary or secondary layer to the overlay. Regular mineral particles (grit) can also be added as the primary or secondary layer. The mineral pigment composites are larger than the regular grit and therefore function as spacers and separators to protect scratch sensitive surfaces from contacting the abrasive grit particles. The overlay is used in preparing a laminate in the usual way. The mineral pigment composites in the overlay minimize the amount of damage to the highly polished caul plates during the lamination process.

Having described the invention in detail, it will be apparent that modifications and variations are possible without departing from the scope of the invention defined in the appended claims:

What is claimed is:

1. A protective overlay sheet comprising a web of cellulose fibers having deposited on the surface thereof a layer of mineral pigment composite particles wherein said composite particles comprise mineral pigment particles embedded in a cured carrier material.

2. A protective overlay in accordance with claim 1 wherein said mineral pigment particle is selected from the group consisting of alumina, silica, silicon carbide, boron nitride and mixtures thereof.

3. A protective overlay in accordance with claim 1 wherein said composite particles have a mean particle size of about 1 to 400 microns.

4. A protective overlay in accordance with claim 1 wherein said composite particles are filamentous in shape.

5. A protective overlay in accordance with claim 4 wherein said filamentous composite particles have a mean length of about 1 to 4 mm.

6. A protective overlay in accordance with claim 1 wherein said carrier material is selected from the group consisting of molten glass, molten quartz and soluble silicates.

7. A protective overlay in accordance with claim 1 wherein said carrier material is a resin.

8. A protective overlay in accordance with claim 7 wherein said carrier material is melamine resin.

9. A protective overlay in accordance with claim 1 further comprising a layer of regular mineral pigment particles.

10. A wear resistant laminate comprising a substrate having a decorative upper layer and a protective overlay, said overlay comprising a web of cellulose fibers having deposited on the surface thereof a layer of mineral pigment composite particles wherein said composite particles comprise mineral pigment particles embedded in a cured carrier material.

11. A wear resistant laminate in accordance with claim 10 wherein said mineral pigment particle is selected from the group consisting of alumina, silica, silicon carbide, boron nitride and mixtures thereof.

12. A wear resistant laminate in accordance with claim 10 wherein said composite particles have a mean particle size of about 1 to 400 microns.

13. A wear resistant laminate in accordance with claim 10 wherein said composite particles are filamentous in shape.

14. A wear resistant laminate in accordance with claim 13 wherein said filamentous composite particles have a mean length of about 1 to 4 mm.

15. A wear resistant laminate in accordance with claim 10 wherein said carrier material is selected from the group consisting of molten glass, molten quartz and soluble silicates.

16. A wear resistant laminate in accordance with claim 10 wherein said carrier material is selected from the group consisting of urea resin, dicyandiamide resin and melamine resin.

17. A wear resistant laminate in accordance with claim 16 wherein said carrier material is melamine resin.

18. A wear resistant laminate in accordance with claim 10 further comprising a layer of regular mineral pigment particles.

* * * * *